United States Patent [19]

Neefe

[11] Patent Number: 4,758,064

[45] Date of Patent: Jul. 19, 1988

[54] COMPRESSED FIBER OPTIC CABLE

[76] Inventor: Charles W. Neefe, P.O. Box 361, Big Spring, Tex. 79721

[21] Appl. No.: 896,806

[22] Filed: Aug. 15, 1986

[51] Int. Cl.$^4$ .............................................. G02B 6/44
[52] U.S. Cl. ................................. 350/96.23; 350/96.24
[58] Field of Search ................ 350/96.23, 96.24, 96.34

[56] References Cited

U.S. PATENT DOCUMENTS

| 3,679,384 | 7/1972 | Colson et al. ................ 350/96.24 X |
| 4,552,431 | 11/1985 | Allemand et al. ............... 350/96.34 |

FOREIGN PATENT DOCUMENTS

| 0008104 | 1/1981 | Japan ................................ 350/96.24 |
| 2111898 | 7/1983 | United Kingdom ............ 350/96.34 |

OTHER PUBLICATIONS

Kaino et al.; "Low Loss Poly(Methylmethacrylate-d8) Core Optical Fibers"; *Appl. Physics Letter*, vol. 42, No. 7, Apr. 1983, pp. 567-569.

*Primary Examiner*—John Lee
*Assistant Examiner*—John Ngo

[57] ABSTRACT

A fiber optical cable for conducting light along its length. The cable is composed of a plurality of transparent polymer fibers. The fibers are formed by drawing the heated viscous polymer from an orifice. In pulling the softened fiber, the polymer molecules become aligned parallel to the sides of the polymer fiber. A surface coating of a lower refractive index transparent polymer is applied. The optical fibers are arranged in the desired order and heated and softened. Pressure is applied against the sides of the heated and softened fiber optic cable compressing the round polymer optical fibers to form fibers having flat sided geometric shapes to eliminate the open spaces and voids between the optical fibers.

16 Claims, 1 Drawing Sheet

COMPRESSED FIBER OPTIC CABLE

The first idea of manufacturing fibers was recorded as early as 1664, but it was some two hundred years later before serious attempts were made to compliment the idea. Then, in 1888, Sir Joseph Swan patented a process for making nitrocellulose filaments.

SUBJECT OF THE INVENTION

Fiber optics principle is that of total internal reflection. Every medium through which light can pass, has a certain refractive index, which determines the amount by which light is bent when it enters that medium. As the angle at which it strikes the medium decreases from the perpendicular, there comes a point where the light is bent so much at a surface that it is completely reflected back into the medium it came from-the critical angle.

The need for improved fiber optic cables, both coherent and incoherent, exists.

The use of improved, high purity, glass and polymers for compressed fiber optics is the subject of the present invention. Connections between two single fiber optic cables is a demanding and difficult task. Compressed fiber optic cables are much simpler to align and connect due to their larger cross section. Multi fiber cables, having conventional round fibers are impractical, due to light loss in the vacant area between the round fibers at connection. The use of hexagon shaped fibers placed in contact with one another eliminates the open space between the fibers. Other geometric shapes such as squares, octagons, or triangles may be used. Flat sided shapes that cannot be described, and fit together in a random fashion, leaving no empty space between, functions equally well. The six sided hexagon remains the orderly and most nearly reproducible configuration. Exact reproducibility of the fiber cross section is not required if the empty spaces between the fibers are removed.

IN THE DRAWING

THE FIBERS ARE MADE AS FOLLOWS

Figure 1:
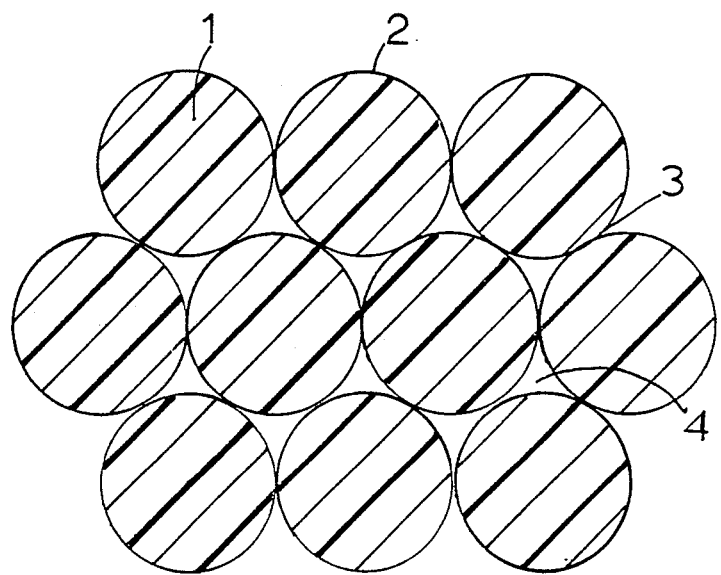
FIG. 1 shows a section from a non-compressed fiber optic cable in section.

A high purity polymer such as styrene is heated to form a viscus liquid and pulled from an orifice to provide the polymer core fiber. Pulling the hot softened fober produces a round fiber having a highly polished exterior surface. The rapid pulling, reduces the fiber diameter to 100 to 500 microns in diameter. The rapid pulling of the hot polymer from an orifice aligns the molecular structure along the axial length of the fiber. Pulling produces molecular fibers which run parallel to the fiber. Styrene, having a refractive index of N=1.60 is coated with a lower refractive inded polymer such as methyl methacrylate, having a refractive index of N=1.49. The coating is accomplished by a simple vertical dip and drain method, wherein the fiber pases upward from the surface of the coating liquid. The crosslinked and catalized methyl methacrylate monomer coating is polymerized by passing through a zone of ultra violet light. The coated fibers are arranged in an orderly pattern, FIG. 1. The pattern shown in FIG. 1, provides for each round fiber to be in contact with its six neighbors. In this arrangement, the spaces, 4 FIG. 1, between the round fibers are the smallest, possible. The stacked array, FIG. 1, is also the most stable. Maintaining coherent image carrying relationships between the fibers is simplified as each fiber is held in place by six of its kind.

THE FIBERS ARE COMPRESSED AS FOLLOWS

Figure 2:
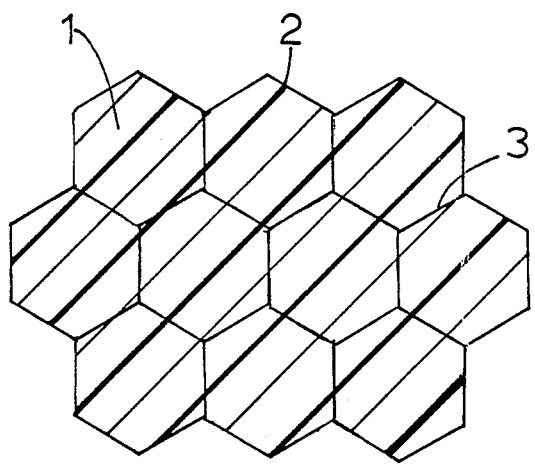
FIG. 2 shows a section from a compressed fiber optic cable in section.

The stacked array of FIG. 1, consists of the high refractive index styrene inner core, 1 FIG. 1, a low refractive index coating, 2 FIG. 1, contact points between fibers, 3 FIG. 1, and the open space between the round fibers, 4 FIG. 1. The stacked array of FIG. 1, is heated to soften the core polymer, 1 FIG. 1. The coating polymer, w FIG. 1, has a higher softening point, due to the crosslinking and does not soften. Pressure is applied to all sides of the array forcing the round fibers, 1 FIG. 1, to be reshaped to form six sided figures, 1 FIG. 2. The contact point 3 FIG. 1, is replaced by the contact line, 3 FIG. 2. The spaces between the round fibers, 4 FIG. 1, are eliminated. The thin low refractive index coating, 2 FIG. 2, is shaped to conform to the flat surfaces of the new compressed fiber optic cable.

Glass fibers may also be reshaped by heating to their softening point.

Connecting two compressed fiber comunication cables is a simple matter, as communication fibers do not require individual alignment. It does not matter which fiber the light enters as all fibers carry the same information. The light from a single fiber may enter more than one of the connecting fibers with little total loss of light as light from the other fibers will also enter the receiving fiber. Alignment of the cable is required, but precise alignment of each fiber is not required.

Coherent fiber optic cables can be spliced and connected, some loss of resolution will result due to optical crossover between fibers.

High purity orientated polymers having low attenuation are used for the core or transmission element. The outer coating polymer must have a lower refractive index than the core element, however, the attenuation factor may be much higher. Lower attentuation is required for long distance communication. Attenuation is not a great problem for short distant imaging coherent fiber optics.

Connecting two compressed fiber optic cables is accomplished by the following steps: the ends of the cables to be connected are cut at a 90° angle to the body of the cable. The end is ground flat and true. Joining styrene based communication cable is accomplished by cementing a thin piece of flat styrene to the prepared end of the cable. Liquid styrene monomer is used to secure the flat styrene plate to the cable end. A suitable ultraviolet sensitive catalyst such as benzoin methyl ether is added in amounts of 0.05 percent to 0.50 percent. The liquid styrene monomer is placed between the fiber cable end and the styrene plate and irradiated with ultraviolet light to polymerize the liquid styrene monomer. The splice is completed by aligning and cementing the second cable to the styrene connector plate.

For precise alignment of fiber optic cable, a flat styrene plate is attached to the end of each cable. A movable lens is placed between the cable end plates whereby the image of the first cable is focused on the end plate of the second cable. The two end plates are held firm in near alignment and the focusing lens is moved across the axis of the two cables to bring the image from the first cable in alignment with the fiber of the second cable.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained.

As many changes could be made in the above construction and methods without departing from the scope of the invention, it is intended that all matter contained in the above description shall be interpreted as illustrative and not in a limiting sense.

I claim:

1. A fiber cable for conducting light along its length composed of a plurality of round transparent core polymer fibers formed by rapidly drawing the heated viscous core polymer from an orifice and allowing the polymer molecules to become aligned parallel to the sides of the core polymer fiber, a surface coating of a crosslinked lower refractive index transparent polymer having a higher softening temperature covers the outer surface of the optical fiber, the optical fibers are heated and the core polymer is softened, the lower refractive index crosslinked coating is not softened, pressure is applied against the sides of the heated fiber optic cable compressing and deforming the round polymer optical fibers to form fibers having flat sided geometric shapes.

2. The subject matter of claim 1 wherein each compressed fiber has six sides.

3. The subject matter of claim 1 wherein the core high refractive index fiber is polystrene.

4. The subject matter of claim 1 wherein the lower refractive index coating is polymethylmethacrylate.

5. The subject matter of claim 1 wherein the optical fibers are coated with a lower refractive index material by withdrawing the fiber from a liquid low refractive index monomer and allowing the film of low refractive index liquid monomer present on the surface of the high refractive index fiber to polymerize, thereby, coating the high refractive index fiber with a low refractive index polymer.

6. The subject matter of claim 1 wherein the high refractive index core fiber has a diameter of from 100 to 500 microns.

7. A fiber optical cable capable of conducting light along its length composed of round transparent high refractive index optical fibers each having been coated with a liquid monomer a containing liquid crosslinker, the liquid monomer is polymerized in the presence of ultra violet light to form a solid coating of lower refractive index crosslinked transparent material having a high softening temperature, the cable of optical fibers is heated to soften the transparent optical fiber, the crosslinked coating is not softened, and pressure is applied against the sides of the heated fiber optic cable to compress and deform the round optical fibers to flat sided geometric shapes.

8. The subject matter of claim 7 wherein each compressed fiber has six sides.

9. The subject matter of claim 7 wherein the core high refractive index fiber is a styrene polymer.

10. The subject matter of claim 7 wherein the lower refractive index coating is a methylmethacrylate polymer.

11. The subject matter of claim 7 wherein the optical fibers are coated with a lower refractive index material by withdrawing the fiber from a liquid low refractive index monomer and allowing the film of low refractive index liquid monomer present on the surface of the high refractive index fiber to polymerize, thereby, coating the high refractive index fiber with a low refractive index polymer.

12. The subject matter of claim 7 wherein the high refractive index core fiber has a diameter of from 100 to 500 microns.

13. A fiber cable for conducting light along its length composed of a plurality of round transparent styrene polymer fibers formed by rapidly drawing the heated viscous styrene polymer from an orifice and allowing the polymer molecules to become aligned parallel to the sides of the styrene polymer fiber, a surface coating of a crosslinked lower refractive index transparent polymer having a higher softening temperature covers the outer surface of the optical fiber, the optical fibers are heated and the styrene polymer is softened, the low refractive index crosslinked coating is not softened, pressure is applied against the sides of the heated fiber optic cable compressing and deforming the round polymer optical fibers to form fibers having flat sided geometric shapes the compressed fiber optic cable is joined to a like fiber optic cable by cementing the ends of the fiber optic cables to sides of a flat styrene connector plate.

14. The subject matter of claim 13 wherein each compressed fiber has six sides.

15. The subject matter of claim 13 wherein the lower refractive index coating is a methylmethacrylate polymer.

16. The subject matter of claim 13 wherein the optical fibers are coated with a lower refractive index material by withdrawing the fiber from a liquid low refractive index monomer and allowing the film of low refractive index liquid monomer present on the surface of the high refractive index fiber to polymerize, thereby, coating the high refractive index fiber with a low refractive index polymer.

* * * * *